United States Patent Office 3,349,073
Patented Oct. 24, 1967

3,349,073
PROCESSES FOR PREPARING DIAZOAMINO COMPOUNDS AND AZO AMINO COMPOUNDS
Charles J. Umberger, 1356 Madison Ave., New York, N.Y. 10028, and Frank F. Fiorese, 40–45 Ely Ave., Bronx, N.Y. 10469
No Drawing. Filed Oct. 25, 1963, Ser. No. 318,832
10 Claims. (Cl. 260—140)

This invention relates to novel processes for the preparation of organic compounds. More particularly, this invention relates to novel processes for the preparation of diazo amino compounds and azo amino compounds. Still more particularly, this invention relates to a method of qualitatively detecting the presence of an aromatic amine or other organic structures.

Diazo amino compounds may be formed along with diazonium salts in the reaction of a primary aromatic amine with nitrous acid. In this reaction, an acidified amine is dissolved or suspended in water and sodium nitrite added to the reaction medium thereby forming a diazonium salt. This classical reaction may be illustrated by the following equation for the preparation of benzenediazonium chloride and diazoaminobenzene employing aniline hydrochloride and nitrous acid as the initial reactants.

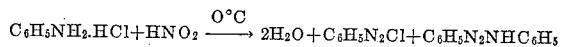

The formation of the diazonium salt is favored by carrying out the reaction at low temperature and at higher acidity. The yield of the diazo amino product is generally increased by lowering the acidity of the reaction medium and by the use of weaker acids such as acetic acid.

Dry diazonium salts are very unstable and are apt to be explosive when attempts are made to isolate them. Diazo amino compounds are also unstable and tend to rearrange to azo amino compounds. The azo amino formation is favored by increased temperature and increased acidity.

Diazo amino compounds are also formed from diazonium salts by the reaction of a diazonium salt and a primary amine in aqueous or slightly acid medium. This reaction may be illustrated by the preparation of diazoamino benzene from benzenediazonium chloride and aniline. The equation for this reaction is as follows:

Diazoamino compounds such as diazoaminobenzene are unstable and when heated with aniline and aniline hydrochloride transforms to amino azo compounds. The preparation of p-aminoazobenzene by this method is illustrated by the following equation:

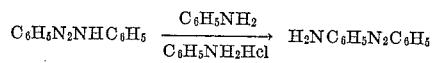

Diazoamino and diazonium compounds may be employed to form azo compounds by means of a coupling reaction in alkaline solutions. This process may be illustrated by the reaction of benzenediazonium chloride and dimethyl aniline to form p-dimethylaminoazobenzene as shown by the equation:

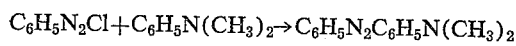

Phenols and some compounds with active methylene groups also couple with diazonium salts like dimethylaniline.

In all of the above described methods for the preparation of diazonium salts and derivatives, the reactions have been carried out in aqueous solutions primarily because it is the only solvent for the nitrite salt. The use of aqueous solutions has numerous disadvantages among which are the poor solubility of some of the initial reactants in water, the necessity of recovering the final products from water solutions in the presence of large amounts of inorganic material and the relatively poor yields of the desired end products. In addition some amines are not diazotizable because they are completely insoluble in water.

It is an object of this invention to provide a novel, simple and efficient process for the preparation of diazo amino compounds.

It is another object of this invention to provide novel processes for the preparation of azo amino compounds in good yield.

It is still another object of this invention to provide novel processes for the preparation of synthetic dyes.

It is a further object of this invention to provide a simple efficient qualitative method for detecting the presence of aromatic amines.

It is still a further object of this invention to provide a process for the preparation of coupled azo compounds.

It is a still further object of this invention to provide a medium which permits the reaction of water insoluble amines to form desired end products.

These and other objects of this invention will become apparent from the following detailed description of this invention.

Therefore according to this invention, there is provided a process for producing diazo amino compounds which comprises reacting in a non-aqueous medium sodium amide, a compound which has acidic properties in non-aqueous solutions and a compound selected from the group consisting of aromatic amines and phenols and recovering the desired product therefrom.

In carrying out this reaction, we have found it essential to employ solid sodium amide as one of the initial reactants. The substitution of other amides for sodium amide will not work in the reaction. For example other amides such as methyl amide, acetamide and formamide have been tried but no reaction occurs. In this reaction, we have also found it necessary to employ a compound which has acidic properties in a non-aqueous medium. Superior results are obtained when trichloracetic acid is employed in this process. Other acids such as dichloracetic acid, monochloracetic acid, acetic acid, maleic acid, succinic acid and dry hydrochloric acid may also be employed in the process. In order for the reaction to proceed, it is also essential that the reaction medium be a non-aqueous medium, and we have found it extremely desirable to carry out the reaction in chloroform and/or benzene solutions. The reaction temperature may be varied over a wide range from about −40° C. to room temperature, but we have found that the best results are obtained at the lower temperature. The reaction may be carried out at any convenient pressure.

Upon completion of the reaction, a yellow product is obtained from the reaction medium by conventional means such as by cooling, vacuum evaporation, etc. This product has all the chemical properties of a diazo amino compound. It will react with aqueous alkaline phenol solutions to give a red color typical of the conventional diazo coupling reaction. Likewise, it will react with alcoholic potassium hydroxide or alcoholic ferric chloride to form metal salts. For example, when aniline in a chloroform and benzene solution was reacted with solid sodium amide and a solution of trichloracetic acid in chloroform and benzene, a yellow crystalline product was obtained which gave a red color typical of a diazo coupling reaction when reacted with aqueous alkaline phenol solutions. Likewise, when the yellow crystalline product was treated with potassium hydroxide, a deep red precipitate was obtained, or when treated with alcoholic ferric chloride, a dark red violet solution was obtained, the latter two reactions suggesting the formation of metallic salts linked to the imino nitrogen of the diazo compound. The yellow crystalline compound was analyzed and determined to be diazoaminobenzene having the formula:

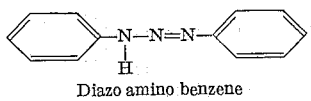
Diazo amino benzene

The identity of the compound was checked by obtaining a sample of this product from a commercial chemical house and the physical and chemical properties matched against those of the commercial sample. Identical chemical and physical properties were obtained in all instances.

Typical of the aromatic amine or phenolic compounds which may be employed in this process and which give intense colors upon completion of the reaction are the following: sulfanilic acid; sulfanilamide; benzocain; benzidine; phenylenediamine; procaine; butacaine; neprime; butelamine; orthoform; ethylaminobenzoate, butylaminobenzoate; butesin; sulfapyridine; sulfathiazole; sulfadiazine; sulfamerazine; sulfametazine; sulfaguanidine; sulfacelamide; sulfasoxazole, sulfadimetine, m-dinitroaniline; aniline; p-chlor-2-methylaniline, 2-aminoazotoluene; carbolic acid; alpha-naphthol; beta-naphthol.

In a further modification of this invention, we have found that the yellow diazo amino compound will react in a non-aqueous medium with a substituted amine or phenol to form highly colored end products, many of which have the properties of dyes.

Without wishing to be bound by any theory, we believe that the addition of the substituted amine or phenol to the yellow product causes the following reaction to occur which yields the same end result as the conventional aqueous azo coupling reaction:

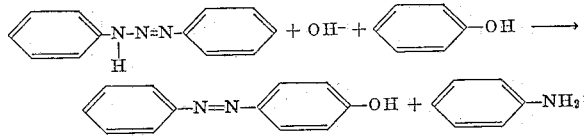

As in the conventional azo coupling reaction, the actual color obtained will be dependent upon the particular reactants employed.

The intensity of this reaction in providing highly colored end products has lead to a further modification of this invention which resides in the development of qualitative tests to detect primary aromatic amines. In carrying out the test for a primary aromatic amine, it is only necessary to place a small sample of the solid or non-aqueous solution of the compound to be tested on a surface such as filter paper and cover the surface with solid sodium amide. The surface is then wet with a saturated solution of trichloracetic acid in chloroform or other organic solvent and if the compound is an amine, a deep yellow color is obtained immediately. Upon addition of chloroform, benzene or other non-aqueous solvent solution of a substituted amine or phenol to the yellow product, a highly colored compound is produced. The specificity of this test is dependent upon the immediate formation of the yellow compound followed by the addition of the other reactants.

In a further modification of this invention, we have found that if substituted amines, phenols, quinones, substituted naphthalenes and phenanthrenes are reacted in a non-aqueous medium with sodium amide and a compound which has acidic properties in a non-aqueous solution at higher temperatures such as room temperature and above, and allowing the reaction to continue for several hours, highly colored products are obtained.

In a further modification of this invention, we have found that azo amino compounds can be formed in good yield from the reaction product of a primary amine and a compound which has acidic properties in a non-aqueous medium. Apparently this azo amino compound is formed from the diazonium compound by a rearrangement. This rearrangement can be induced by treating the diazo amino compound with a dilute acid aqueous solution such as a 1 N hydrochloric acid, at room temperature. This reaction is generally complete in 2–4 days. Heating the solution increases the reaction such that the rearrangement is generally complete in less than 2 hours. We have also found that the diazo amino compound can be rearranged to the azo amino compound by subjecting the diazo amino compound to vacuum sublimation. In this rearrangement the amino nitrogen of the diazo amino compound rearranges to form the corresponding azo amino compound. Thus, for example, if aniline is treated in a chloroform and a benzene solution with sodium amide and a saturated trichloracetic acid solution of chloroform and benzene, the product extracted with 1 N aqueous hydrochloric acid and allowed to stand, crystals are deposited which have a melting point of 116–119° C. This compound was found by melting point and optical properties to be para amino azo benzene which formation may be illustrated by the following equation:

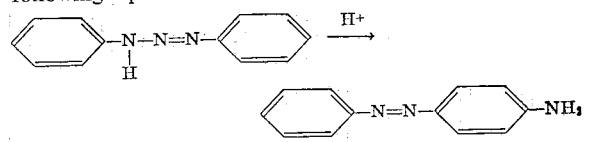

Moreover, we have found that the azo amino product formed by the above rearrangements possess aromatic amine properties and when treated with sodium amide and an acidic compound such as trichloracetic acid will undergo the same reaction as the initial primary aromatic amine to form a diazoamino compound of the rearranged azo amino compound. Thus this reaction in steps permits building up a chain of aromatic radicals coupled by nitrogen linkages.

Therefore while para-aminoazobenzene does not react to form salts and does not couple because it does not have an active site linked to the amino nitrogen, it does have aromatic amine properties as mentioned above and it will undergo the same type of reaction thereby forming the diazoamino compound of a para-aminoazobenzene which compound is believed to have the structural formula set forth below:

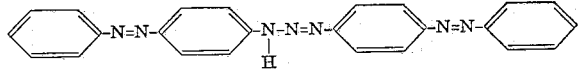

Re arrangement of the diazo amino compound only takes place when the para position in the compound is not blocked. If, for example, a diazo amino compound such as 2,4 di nitro aniline is treated with sodium amide and trichloracetic acid in chloroform, a yellow orange product is obtained. This product reacts with nonaqueous alkali and with nonaqueous ferric chloride to form a salt in the same manner as diazo amino benzene because it has an active site on the amino nitrogen. It also forms a salt with strong acids showing typical amphoteric properties. The addition of a phenol such as carbolic acid or alpha naphthol in the presence of hydroxyl ions results in a coupling type action. Treatment with aqueous acid or alkaline solutions, however, does not alter the structure as was the case in the reaction of diazo amino benzene. This indicates that there has been no rearrangement. The compound produced is believed to be diazo amino 2,4 dinitro benzene and to have the structural formula:

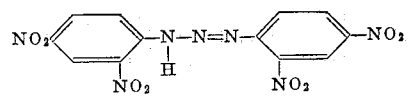

This compound is apparently not able to rearrange because the para position is not free.

Thus this reaction permits the deliberate blocking in the para position of a primary aromatic amine therefore preventing the rearrangement to an azo amino compound. The blocked para-positions can be unblocked if desired under conditions which do not induce the rearrangement as known in the art.

An unusual characteristic of this reaction is the ease with which 2,4-dinitro aniline reacts in the non-aqueous media. In aqueous solution this amine is known to be extremely difficult to diazotize and at best the yield of the diazoamino compound is very low. Hence, we have found that amines that are difficulty soluble in water react readily under the non-aqueous conditions of our reaction.

In carrying out the coupling reactions of this invention, we have found that it is not necessary for the diazoamino compound to be isolated prior to being reacted with the substituted amines or phenolic compounds. We have discovered that the coupling reaction can be carried out in a single operational step by employing an excess of sodium amide to the amine in the reaction. We believe that even though the non-aqueous solution is acid, the sodium amide acts in its capacity as a base to induce the coupling reaction.

For a more detailed description of the invention, reference should now be had to the following examples which are illustrative of this invention. It is obvious that many modifications will be apparent to those skilled in the art and applicants intend to be bound only by the spirit and scope of the appended claims.

Example 1

One gram of aniline was dissolved in chloroform in an ice bath to which was added 1.26 grams of sodium amide. To this mixture a saturated solution of 9 grams of trichloracetic acid in chloroform was added in small portions with stirring until the reaction medium was acid to congo paper. The chloroform solution was then filtered to remove any sodium trichloroformate and any excess sodium amide. The reaction mixture was then evaporated under reduced pressure at about 50 microns with the temperature being maintained below 25° C. The product obtained from the evaporation was a yellow crystalline powder.

One portion of the yellow crystalline powder was reacted with potassium hydroxide and a red precipitate was obtained. A second portion of the yellow crystalline powder was reacted with a chloroform solution of ferric chloride and a red solution and precipitate was obtained. These reactions indicate the presence of the

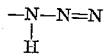

grouping. A third portion of the yellow crystalline powder was reacted with alpha naphthol in chloroform solution to which was added dilute sodium hydroxide. A deep magenta color was obtained typical of the azo coupling reaction.

The color produced by the latter reaction was matched against the color produced by the reaction of aniline and alpha naphthol in aqueous alkaline solution and the same visible spectrum was obtained on the Beckman spectrophotometer.

The yellow residue was purified by dissolving it in benzene and filtering it. The benzene solution was then washed with sodium bicarbonate to remove any excess trichloracetic acid and finally with distilled water. The benzene solution was then evaporated under vacuum until crystals precipitated. This compound was determined to be diazoaminobenzene. The yellow crystals had a melting point of 92–95° C. This diazoaminobenzene was mixed with diazoaminobenzene obtained from a commercial chemical company and a mixed melting point of 91–93° C. was obtained. The nitrogen content was analyzed by the Dumas method and was found to be 21.6%; the theoretical amount being 21.3%. The carbon was analyzed by the Pregel method and was determined to be 72.5%; the theoretical amount being 73%. Hydrogen was also determined by the Pregel method and was determined to be 5.1%; the theoretical amount being 5.5%.

Example 2

One gram of aniline was dissolved in benzene to which was added 1.26 grams of sodium amide. A saturated solution of 9 grams of trichlorocetic acid in benzene was added in small portions with stirring until the reaction medium was acid to congo paper. An equal volume of 3 N hydrochloric acid was added to the benzene solution with stirring. The mixture was allowed to stand for two days. At the end of two days, blue crystals had precipitated out and were filter dried at 80° C. in a vacuum. The product had a melting point of 225° C. and upon recrystallization from ethyl alcohol, had a melting point of 226° C.

A portion of the blue crystals were reacted with sodium nitrate and nitric acid solution and a positive test for the chloride ion was obtained thus indicating the formation of a salt. Another portion of the blue crystals were dissolved in hydrochloric acid solution to which was added sodium amide, alpha napthol and dilute sodium hydroxide. A deep red color was formed indicative of a coupling reaction. This compound was determined to be para-aminoazobenzene hydrochloride. The nitrogen content was determined by the Dumas method as 17.9%; the theoretical amount being 17.9%.

The free base was formed by washing the blue crystals with 10% sodium carbonate solution and insoluble yellow precipitate formed which was filtered, washed with water and dried in a vacuum. The yellow precipitate was found to be a para-aminoazobenzene and its melting point was determined to be 125–126° C. The melting point for para-aminoazobenzene in the Handbook of Chemistry is listed as 126–127° C.

Example 3

11 milliliters of O-toluidine was added to 16.3 grams of trichloracetic acid in 150 milliliters of chloroform to which was added 6 grams of sodium amide. The solution was allowed to stand for 18 days at room temperature with occasional shaking. An initial yellow color was obtained which slowly changed to dark orange. The orange solution was evaporated in a steam bath and 3 N hydrochloric acid added to the residue whereupon the color changed to magenta. The crystals were washed with 3 N hydrochloric acid and dried at 50° C. A yield of 9.24 grams was obtained.

The crystals were then dissolved in 40% ethyl alcohol to which was added 5 N sodium hydroxide in an amount sufficient to make the solution alkaline. The solution was allowed to stand overnight during which time yellow crystals formed. The crystals were sublimed in vacuum and determined to have a melting point of 96–101° C. This compound was determined to be 4-amino-2,3-dimethylazobenzene which has the formula:

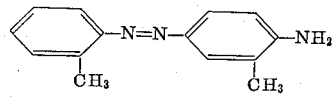

The yield obtained was 83.6% of the theoretical.

The above example demonstrates that compounds substituted in the ortho position rearrange like diazoaminobenzene and that reaction conditions such as long times and higher temperature favor the rearrangement.

Example 4

One mol of 2,4-dinitroaniline was treated with 3 mols of sodium amide and 5 mols of trichloracetic acid in chloroform. Upon vacuum evaporation, a yellow residue was obtained which was washed in water and dried in vacuum. This compound was relatively unstable and decomposed during attempts to recrystallize it at slightly elevated temperatures. It also decomposed on vacuum sublimation.

Infra-red analyses indicated characteristic absorption peaks between 6 and 8 microns for the

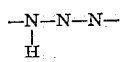

structure. The yellow crystals were reacted with phenol in chloroform to which was added dilute sodium hydroxide in amounts sufficient to adjust the pH to 9. The red precipitate was filtered and washed with water.

The chloroform-water filtrate was extracted with an equal volume of 1–1 hydrochloric acid. On separation of the two layers, the aqueous acid layer was an intense green and the chloroform layer red. Vacuum evaporation of the chloroform layer left a red powder identical in properties to that of the original red precipitate removed in the first filtration. Upon diluting the green aqueous acid layer with 2 volumes of water to reduce the acidity and again extracting with chloroform, the green color passed into the chloroform layer upon which evaporation left a blue-green residue.

Thus two compounds were obtained in the coupling of 2,4 dinitroaniline with phenol with the red product in much higher yield.

Example 5

One mol of 2-amino-5-chlorotoluene was reacted with 3 mols of sodium amide and 5 mols of trichloracetic acid at room temperature. After vacuum evaporation a yellow-brown residue was obtained which reacted with alcoholic KOH and alcoholic ferric chloride solutions thereby indicating the presence of the

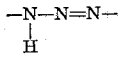

structure. An infra-red spectrum analysis gave a characteristic absorption peak between 6 and 8 microns for the above structure.

Upon reacting this compound with alpha naphthol in chloroform to which was added dilute sodium hydroxide, a deep maroon dye was obtained. A conventional aqueous coupling reaction using 2-amino-5-chlorotoluene with sodium nitrite, alpha naphthol and dilute sodium hydroxide gave a deep maroon dye which absorption spectrum was compared on a Beckman spectrophotometer with the dye prepared by the above process. Both dyes gave the same readings.

Example 6

Para-aminoazobenzene was reacted with 3 mols of sodium amide and 5 mols of trichloracetic acid in chloroform. A red-brown residue was obtained by vacuum evaporation. This compound had a molecular weight in excess of 350 and dyed cotton and wool a deep red-brown color.

Example 7

One mol of sulfanilic acid was reacted with 3 mols of sodium amide and 5 mols of trichloracetic acid in chloroform solution. After thorough mixing, alpha naphthol in chloroform was added and the chloroform solution evaporated. A red violet precipitate was obtained.

One mol of sulfanilic acid was dissolved in 1 N dilute hydrochloric acid and 2 mols of sodium nitrite added. An alkaline solution of alpha naphthol dissolved in water containing sodium hydroxide at a pH of 9.5 was then added. A deep red violet solution typical of an aqueous azo coupling solution was obtained. The concentration of the red violet precipitate was adjusted in water to match the intensity of the red violet solution formed during the conventional coupling reaction. Absorption spectrum measured in the visible region on a Perkin-Elmer spectrophotometer was the same for both solutions.

The experiment was repeated using procain, benzocain and ethyl para-aminobenzoate and identical results were obtained when compared with the corresponding compounds formed by conventional azo coupling reactions.

We claim:
1. A process for producing an N,N'-diaryldiazoamino compound which comprises reacting at a temperature in the range of −40° C. to room temperature in a non-aqueous, acidic medium, sodium amide and a diazotizable, primary, aromatic amine.
2. A process according to claim 1 wherein said non-aqueous acidic medium is an acid of the group consisting of trichloracetic acid, dichloracetic acid, monochloracetic acid, acetic acid, maleic acid, succinic acid and dry hydrochloric acid in at least one of chloroform or benzene.
3. A process according to claim 2 wherein said non-aqueous acidic medium is trichloracetic acid in chloroform.
4. A process according to claim 1 wherein said diazotizable, primary, aromatic amine is of the benzene or naphthalene series and is unsubstituted or substituted with a substituent of the group consisting of methyl, amino, aminophenyl, hydroxyl, sulfo, nitro, chloro, sulfamyl, N-acetylsulfamyl, N-guanidinosulfamyl, N-pyridylsulfamyl, N - pyrimidinylsulfamyl, N - (methyl-pyrimidinyl)sulfamyl, N - (dimethyl-pyrimidinyl)sulfamyl, N-thiazolylsulfamyl, N - (dimethylisoxazolyl)sulfamyl, methoxycarbonyl, ethoxycarbonyl, butoxycarbonyl, 2-(N, N-diethylamino)ethoxycarbonyl, 2-(N-butylamino)-ethoxycarbonyl and 3-(N,N-dibutylamino)propoxycarbonyl.
5. A process according to claim 4 wherein said non-aqueous medium is trichloracetic acid in chloroform.
6. A process according to claim 1 wherein the product thereof is reacted in a non-aqueous, basic medium with a phenol having an unblocked para-position to produce an N-aryl-N'-(p-hydroxyaryl) diazo compound.
7. A process according to claim 1 wherein said sodium amide is employed in excess and wherein, after production of said N,N'-diaryldiazoamino compound, there is added to the reaction mixture and reacted with the product therein a primary aromatic amine or phenol having an unblocked para-position to produce an N-(p-aminoaryl)-N'-aryldiazo compound or an N-(p-hydroxyaryl)-N'-aryldiazo compound.
8. A process according to claim 1 wherein the product thereof which is unblocked in the para-position is heated at an elevated temperature in a non-aqueous, acidic medium to produce an N-(p-aminoaryl)-N'-aryldiazo compound.
9. A process according to claim 1 wherein the product thereof which is unblocked in the para-position is subjected to vacuum sublimation to produce an N-(p-aminoaryl)-N'-aryldiazo compound.
10. A process for producing an N,N'-bis[p-(arylazo)-aryl]diazoamino compound which comprises reacting at a temperature in the range of −40° C. to room temperature in the non-aqueous, acidic medium, sodium amide and a diazotizable N-(p-aminoaryl)-N'-aryldiazo compound.

References Cited

Berezovski et al., C.A., vol. 56, pp. 11473–11474 (1962) QD 1. A 51.

Krabbe et al. Ber. Deut. Chem., vol. 74, pp. 1343–1352 (1941) QD 1. D4.

Rodd., "Chemistry of Carbon Compounds," vol. III<sup>A</sup>, p. 304 (1954) QD 251. R6.

CHARLES B. PARKER, *Primary Examiner.*

F. D. HIGEL, *Assistant Examiner.*